(12) United States Patent
Balo

(10) Patent No.: US 7,974,651 B2
(45) Date of Patent: Jul. 5, 2011

(54) AUTOMATICALLY SWITCHING A TDMA RADIO AFFILIATED WITH A FDMA SITE TO A TDMA SITE

(75) Inventor: Kamran Rahimi Balo, Lake In The Hills, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 623 days.

(21) Appl. No.: 11/762,094

(22) Filed: Jun. 13, 2007

(65) Prior Publication Data

US 2008/0311945 A1 Dec. 18, 2008

(51) Int. Cl.
*H04Q 7/20* (2006.01)

(52) U.S. Cl. ........ 455/518; 370/319; 370/320; 370/321; 370/322; 370/323; 370/324; 370/325

(58) Field of Classification Search ............... 455/518
See application file for complete search history.

(56) References Cited

U.S. PATENT DOCUMENTS

| | | | | |
|---|---|---|---|---|
| 4,181,886 A * | 1/1980 | Cooperman | ......... | 342/352 |
| 5,371,734 A * | 12/1994 | Fischer | ......... | 370/311 |
| 5,488,640 A * | 1/1996 | Redden et al. | ......... | 375/357 |
| 5,689,810 A | 11/1997 | Shaughnessy et al. | | |
| 5,724,648 A | 3/1998 | Shaughnessy et al. | | |
| 5,758,291 A * | 5/1998 | Grube et al. | ......... | 455/518 |
| 5,790,527 A * | 8/1998 | Janky et al. | ......... | 370/330 |
| 5,850,611 A * | 12/1998 | Krebs | ......... | 455/518 |
| 6,014,375 A * | 1/2000 | Janky | ......... | 370/347 |
| 6,204,844 B1 * | 3/2001 | Fumarolo et al. | ......... | 715/736 |
| 6,647,020 B1 | 11/2003 | Maher et al. | | |
| 6,834,194 B2 * | 12/2004 | Hunzinger | ......... | 455/452.2 |
| 6,937,856 B2 * | 8/2005 | Baudino et al. | ......... | 455/418 |
| 6,983,009 B2 * | 1/2006 | Lomp | ......... | 375/149 |
| 6,985,467 B2 * | 1/2006 | Lomp et al. | ......... | 370/335 |
| 7,020,111 B2 * | 3/2006 | Ozluturk et al. | ......... | 370/335 |
| 7,058,415 B2 * | 6/2006 | Bushnell et al. | ......... | 455/461 |
| 7,072,380 B2 * | 7/2006 | Ozluturk et al. | ......... | 375/141 |
| 7,085,365 B2 * | 8/2006 | Kauppinen | ......... | 379/202.01 |
| 7,092,721 B2 * | 8/2006 | Harris et al. | ......... | 455/455 |
| 7,123,600 B2 * | 10/2006 | Ozluturk et al. | ......... | 370/335 |
| 7,197,016 B2 * | 3/2007 | Belcea | ......... | 370/321 |
| 7,400,895 B2 * | 7/2008 | Chang et al. | ......... | 455/502 |
| 7,463,592 B2 * | 12/2008 | Poncini et al. | ......... | 370/252 |
| 7,469,149 B2 * | 12/2008 | Harris et al. | ......... | 455/519 |
| 7,535,874 B2 * | 5/2009 | Ozluturk et al. | ......... | 370/335 |
| 7,555,300 B2 * | 6/2009 | Scheinert et al. | ......... | 455/450 |
| 7,596,224 B2 * | 9/2009 | Klug et al. | ......... | 380/270 |
| 7,610,057 B2 * | 10/2009 | Bahl et al. | ......... | 455/522 |
| 7,653,186 B2 * | 1/2010 | Hosain et al. | ......... | 379/106.01 |

(Continued)

OTHER PUBLICATIONS

TDMA Technology White Paper 2008, Motorola, 12 pages.*

*Primary Examiner* — Duc M Nguyen
*Assistant Examiner* — Hai V Nguyen
(74) *Attorney, Agent, or Firm* — Brian M. Mancini; Valerie M. Davis

(57) ABSTRACT

A method and system for dynamically triggering re-connection of a TDMA-capable radio to a TDMA-based talk group via a TDMA site. The dynamic re-connection is triggered by the group call controller when an initial request for connection to the TDMA-based talk group is made through an FDMA site by the TDMA-capable radio.

19 Claims, 4 Drawing Sheets

U.S. PATENT DOCUMENTS

| | | | |
|---|---|---|---|
| 7,668,148 B2* | 2/2010 | Baarman et al. | 370/347 |
| 7,684,813 B2* | 3/2010 | Benson et al. | 455/517 |
| 7,684,816 B2* | 3/2010 | Furrer et al. | 455/518 |
| 7,747,270 B2* | 6/2010 | Schwagmann et al. | 455/519 |
| 7,787,433 B2* | 8/2010 | Sato | 370/344 |
| 7,792,899 B2* | 9/2010 | Shaffer et al. | 709/204 |
| 7,885,674 B2* | 2/2011 | Shaffer et al. | 455/518 |
| 2002/0089945 A1* | 7/2002 | Belcea | 370/321 |
| 2003/0013454 A1* | 1/2003 | Hunzinger | 455/452 |
| 2003/0142638 A1* | 7/2003 | Belcea | 370/321 |
| 2003/0185166 A1* | 10/2003 | Belcea | 370/321 |
| 2004/0028003 A1* | 2/2004 | Diener et al. | 370/319 |
| 2004/0047324 A1* | 3/2004 | Diener | 370/338 |
| 2004/0127233 A1 | 7/2004 | Harris et al. | |
| 2004/0219925 A1* | 11/2004 | Ahya et al. | 455/450 |
| 2005/0054360 A1* | 3/2005 | Baudino et al. | 455/517 |
| 2005/0096064 A1* | 5/2005 | Hunzinger | 455/452.2 |
| 2005/0174970 A1* | 8/2005 | Krishnamurthi et al. | 370/335 |
| 2005/0232406 A1* | 10/2005 | Kauppinen | 379/202.01 |
| 2005/0239497 A1* | 10/2005 | Bahl et al. | 455/552.1 |
| 2006/0019681 A1* | 1/2006 | Harris et al. | 455/464 |
| 2006/0072481 A1* | 4/2006 | Hirsbrunner et al. | 370/254 |
| 2006/0079262 A1* | 4/2006 | Harris et al. | 455/520 |
| 2006/0116145 A1* | 6/2006 | Hunzinger | 455/510 |
| 2006/0120302 A1* | 6/2006 | Poncini et al. | 370/254 |
| 2006/0123224 A1* | 6/2006 | Klug et al. | 713/150 |
| 2006/0294243 A1* | 12/2006 | Kuure et al. | 709/227 |
| 2007/0130456 A1* | 6/2007 | Kuo et al. | 713/150 |
| 2007/0178939 A1* | 8/2007 | Raftelis et al. | 455/560 |
| 2007/0217365 A1* | 9/2007 | Rezaiifar et al. | 370/331 |
| 2007/0293259 A1* | 12/2007 | McDonald et al. | 455/518 |
| 2008/0013497 A1* | 1/2008 | Belcea | 370/337 |
| 2008/0161029 A1* | 7/2008 | McDonald et al. | 455/509 |
| 2008/0273487 A1* | 11/2008 | Naghian | 370/328 |
| 2008/0311945 A1* | 12/2008 | Balo | 455/518 |
| 2009/0109882 A1* | 4/2009 | Averbuch et al. | 370/296 |
| 2009/0253430 A1* | 10/2009 | Asanuma et al. | 455/434 |
| 2010/0329126 A1* | 12/2010 | Van Gassel et al. | 370/242 |
| 2010/0332674 A1* | 12/2010 | Van Gassel et al. | 709/231 |

* cited by examiner

# AUTOMATICALLY SWITCHING A TDMA RADIO AFFILIATED WITH A FDMA SITE TO A TDMA SITE

BACKGROUND

1. Technical Field

The present invention generally relates to wireless communication systems, and in particular to methods and systems for providing group call functionality within a wireless communication system.

2. Description of the Related Art

Use of wireless networks to provide group calling services is known in the art. Group calling services typically allow member devices (e.g., portable or mobile radios) located within range of the communication system's fixed network elements (FNE) to communicate with each other via a talk group. Some group calling services/systems were designed around frequency division multiple access (FDMA) technology, and the member devices are traditionally FDMA-enabled radios communication using FDMA communication protocols. An example of such a system is the Astro system.

The Astro system supports/dispatches talk groups. The Astro system is typically utilized by public and/or emergency services, such as fire service, hospitals, police, and similar groups to enable simultaneous broadcast/exchange of communication to multiple member devices within the particular talk group. The typical Astro system operates via FDMA protocol, and each radio that joins the talk group is connected via an FDMA channel, if one is available. When the FDMA resources are not available, i.e., there is no available communication frequency on which to connect the new radio, the radio is not able to connect to the talk group.

Conventional Astro systems and radios developed for use therein are typically FDMA-based. Recently, newer types of radios have been developed with time division multiple access (TDMA) capabilities, and these newer radios are being utilized within the conventional FDMA-based Astro systems. When a TDMA radio is added to a talk group via an FDMA site, the access via the FDMA site forces the entire talk group to communicate using FDMA protocol. Thus, with the use of FDMA sites controlling the talk group communications, several limitations are seen with talk group operations, even when the radios themselves are TDMA-capable devices.

FDMA protocol has the limitation of having limited frequency resources to allocate, when compared to other communication protocols (e.g., TDMA, CDMA, etc.). When a TDMA-capable radio affiliates to an FDMA site, the TDMA capable radio is affiliated using FDMA protocol. If the TDMA-capable radio affiliates to a talk group via the FDMA site, and the talk group is operating via the TDMA protocol and only has TDMA-capable radios affiliated therewith, the operational mode of the talk group will be forced to FDMA mode because of the connection of the new radio via the FDMA site. This changing of the talk group's operational mode to an FDMA mode requires all affiliated members of the talk group (i.e., all of the TDMA-capable radios) to fall back to FDMA operation mode, which is less efficient and more resource-intensive.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
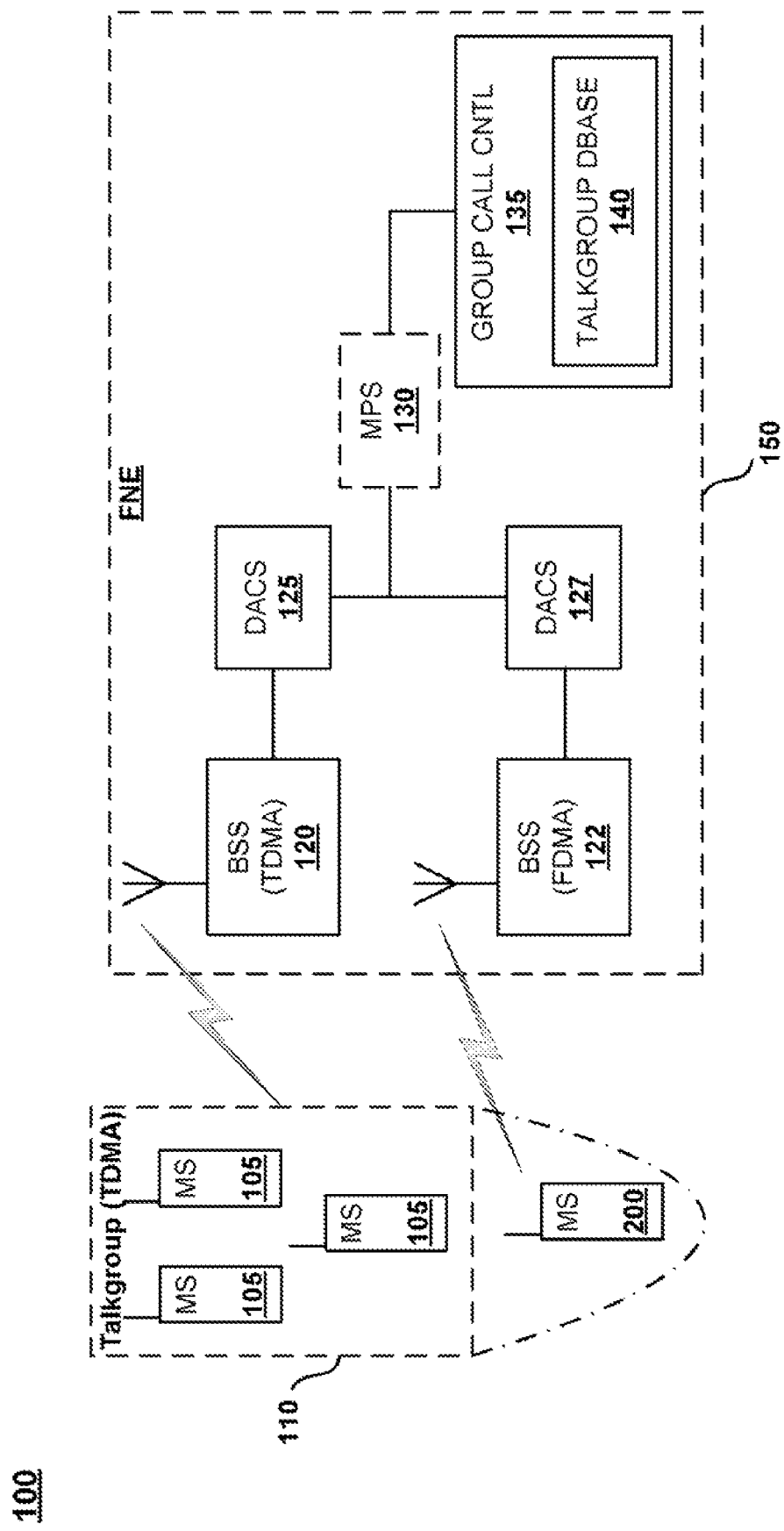
FIG. 1 illustrates a communication system that supports access by mobile radios to talk groups via both FDMA and TDMA site connections, according to one embodiment of the invention.

The present invention provides a method and a system for dynamically triggering a re-connection of a TDMA-capable radio to a TDMA-based talk group (hereinafter "TDMA talk group") via a TDMA site. The dynamic re-connection is triggered by the group call controller when an initial request for connection to the TDMA talk group is made through an FDMA site by the TDMA-capable radio.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g., 1xx for FIG. 1 and 2xx for FIG. 2). The specific numerals assigned to the elements are provided solely to aid in the description and not meant to imply any limitations (structural or functional) on the invention.

It is understood that the use of specific component, device and/or parameter names (such as those of the executing utility described herein) are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

With reference now to the figures, and in particular FIG. 1, there is illustrated an example communication system within which the features of the described embodiments are implemented. As shown, wireless communication system 100 comprises a wireless network infrastructure of fixed network elements (FNE) 150. FNE 150 includes multiple Base Station Subsystems (BSSs) of which TDMA site 120 and FDMA site 122 are shown. TDMA site 120 and FDMA site 122 are each operably coupled to respective Digital Access Cross-connect Switches (DACS) 125, 127. Each DACS 125, 127 is in turn coupled to a Metro Packet Switch (MPS) 130, and the MPS 130 is in turn operably coupled to a Group Call Controller (Cntl) 135. DACSs 125 and 127 and MPS 130 are available from Motorola, Inc., of Schaumburg, Ill. Because these infrastructure components are often geographically fixed, BSSs 120 and 122, DACSs 125 and 127, MPS 130, and Group Call Cntl 135 are collectively referred to herein as Fixed Network Elements (FNEs) 150 of communication system 100.

Preferably, Group Call Cntl 135 includes enhanced logic (hardware, firmware or software utility) to respond to a request to affiliate with or initiate a talk group from a TDMA-capable radio (e.g., mobile radio 200) according to the process described below with reference to FIGS. 3 and 4. This logic may be additional functionality added to the resource allocator logic of Group Call Cntl 135. In one embodiment, Group Call Cntl 135 is modified to perform the functions described below, when communicating with a radio through FDMA site 122.

Group Call Cntl 135 maintains and tracks provisioning and mobility information with respect to group calls for each communication radio (105, 200) in communication system 100, including registration of the device when the device activates in communication system 100 and control of group calls. Group Call Cntl 135 includes a communication resource allocator and other functional components (provided as hardware, firmware, and/or software components) that enable the various features described herein. Group Call Cntl 135 includes, or is operably coupled to, a database 140 that stores, in association with each talk group (110) included in communication system 100, a talk group identifier uniquely associated with the talk group and a list of radio identifiers, wherein each radio identifier in the list of radio identifiers corresponds to a MS 105 or radio 200 that is a member of the talk group.

In addition to FNE 150, communication system 100 further comprises multiple mobile stations (MSs) 105 and radio 200, which represent user devices that communicate with each other through FNE 105. Each MS 105 and radio 200 is in wireless communication with a BSS (120 or 122), and the BSS (120 or 122) provides wireless communication services to the MS 105 and radio 200 via one or several available access protocols. As shown by FIG. 1, MSs 105 are affiliated with a talkgroup 110 and communicate with TDMA site 120 using TDMA protocol. For simplicity in describing the embodiments, the talk group is referred to herein as TDMA talk group and each MS 105 is assumed to be a TDMA-capable radio connected to TDMA talk group via a TDMA site (120). As further shown, radio 200 is not initially a part of talk group 110. However, as explained in greater detail below, radio 200 requests connection to talk group 110 via FDMA site 122, and radio 200 is then triggered by FDMA site 122 to re-connect to talk group 110 via TDMA site 120.

Database 140 stores, in association with each device (105, 200) included in communication system 100, a device identifier associated with the device, dispatch services subscribed to by the device, and a list of talkgroups, preferably the talkgroup identifier associated with each talkgroup, of which the device/radio is a member. Database 140 may be included in a Home Location Register (HLR) or a Visited Location Register (VLR), or a combination of a HLR and a VLR.

The exemplary communication system 100 is a mobile phone network that is able to support both cellular telephone and dispatch service. The communication system 100 supports any number of wireless devices (105, 200). According to the illustrated embodiment, these wireless devices are mobile phones; however, it is understood that the wireless devices may be other types of communication devices, including, for example, text messaging devices, handheld computers, pagers, beepers, or the like.

In the described embodiment, the communications standard supported by communication system 100 includes Time Division Multiple Access (TDMA) and Frequency Division Multiple Access (FDMA). According to the described embodiments of the invention, TDMA site 120 is a Time Division Multiple Access (TDMA) communication sub-system in which communication channels, such as traffic channels and control channels, comprise time slots in a frequency bandwidth. Efficient use of available resources (e.g., frequency) is provided when TDMA site 120 is utilized to support the talk group 110 and to join TDMA-capable devices to the talk group 110. Basic operation and configuration of the wireless communication system 100 is enhanced herein to enable certain features of the illustrative embodiments, which are described with reference to FIGS. 3 and 4, presented below.

With the above configuration of communication system 100, the communication infrastructure supports the processing of group calls, which processing is further enhanced by the methods described herein. In the described embodiment, Group Call Cntl 135 has software programs executing thereon, including a Talk Group Re-affiliate Trigger (TGRT) utility, which performs the management of group call processing, including the various modifications of that process provided by the embodiments described herein. In an alternate embodiment, the controller is the base station controller (BSC) of the BSS (or site), and the controller executes the Talk Group Re-affiliate Trigger (TGRT) utility to prompt/trigger a radio (200) to complete one or more group call functions, as described herein. The BSC (not specifically shown) is controlled by software algorithms stored in local BSS memory, and the BSC manages the wireless air interface with the communication devices (MS 110 and radio 200).

Figure 2:
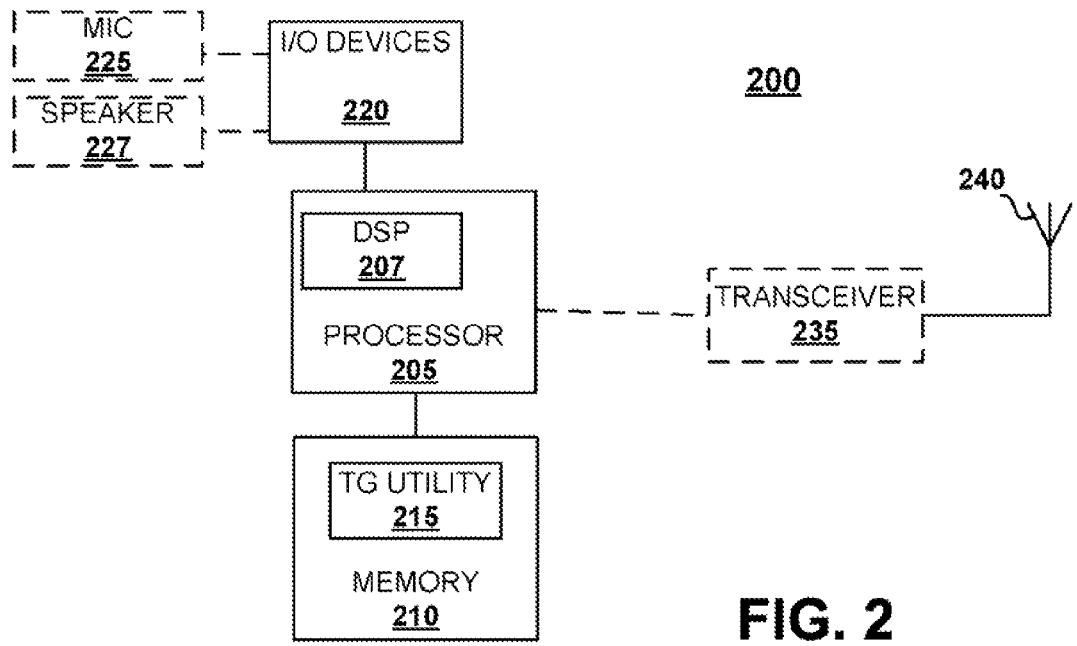
FIG. 2 is an example TDMA-capable radio, with components utilized to trigger the radio to re-connect to a TDMA-based talk group via a TDMA site, in accordance with one embodiment of the invention.

With reference now to FIG. 2, there is illustrated an example radio 200, which is a mobile radio device that connects to a talkgroup (e.g., talkgroup 110 of FIG. 1) via a communication site within FNE 150 (FIG. 1), in accordance with the illustrative embodiments. Radio 200 comprises processor 205, which may include one or more or combinations of microprocessors, microcontrollers, and/or digital signal processors (DSPs) 207. Radio 200 also comprises an associated memory 210, such as random access memory (RAM), dynamic random access memory (DRAM), and/or read only memory (ROM) or equivalents thereof, that store data and programs that may be executed by processor 205. In the illustrated embodiment, memory 210 includes talk group (TG) utility 215, which executes on processor 205 and enables radio 200 to (1) initiate a talk group and/or (2) request to join an existing talk group, and more specific to the invention, (3) respond to a trigger from a group call controller (received via a FDMA site) to re-affiliate a talk group connection via a TDMA site, if available. Memory 210 may also store a radio identifier that is uniquely associated with radio 200 and talkgroup identifiers that correspond to each of the talk groups of which radio 200 is a member.

Radio 200 is illustrated having several additional components, including I/O devices 220, such as microphone 225 and speaker 227 for enabling voice communication with other communication devices (e.g., MS 105, FIG. 1). Radio 200 also includes a transceiver 235 (which may be a separate transmitter-receiver pair) and antenna 240 for enabling voice and data communication to and from radio 200 via wireless reception or transmission.

Those of ordinary skill in the art will appreciate that the hardware depicted in FIGS. 1 and 2 may vary. For example, other devices/components also may be used in addition to or in place of the hardware depicted. Thus, the depicted examples are not meant to imply architectural limitations with respect to the present invention.

In one embodiment, the invention provides a method for infrastructure elements of the communication system 100 to direct a TDMA-capable radio to switch from affiliating to a talk group via an FDMA site to affiliating via a TDMA site. The switch over is prompted/triggered based on the composition of the talk group. The group call controller (associated with at least the FDMA site) determines if the FDMA site is not an ideal site for that talk group (e.g., there are no other radios affiliated to the talk group via that, or other, FDMA sites). Assuming this is the case, the group call controller sends a message to that radio requesting that the radio find a suitable TDMA site to which the radio can affiliate. If the radio finds a suitable TDMA site, the radio re-affiliates to the talk group at the new TDMA site. Otherwise, the radio stays affiliated to the talk group via the FDMA site.

Figure 3:
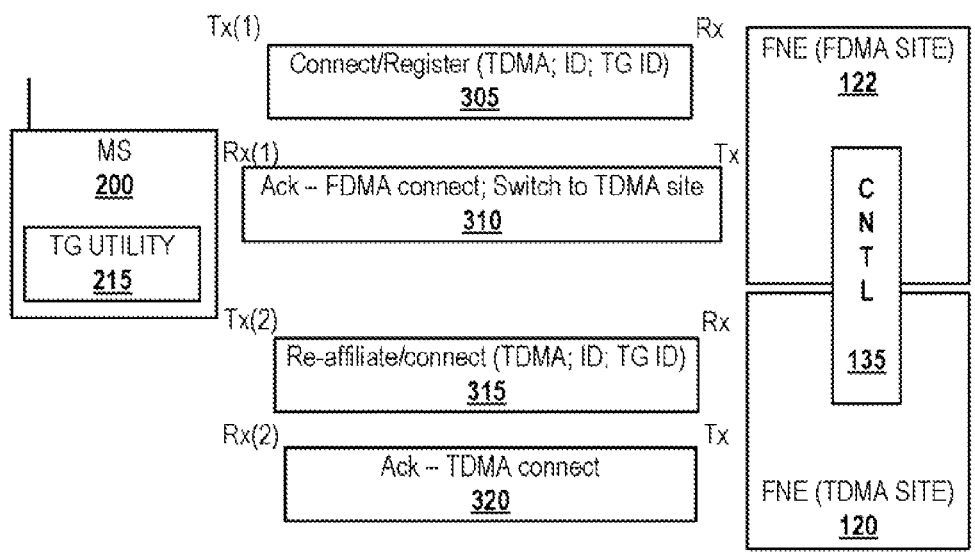
FIG. 3 illustrates a sequence of communication exchanges over the control channel when a TDMA-capable radio connects to a talk group via a FDMA site and then via a TDMA site, in accordance with one embodiment of the invention.

FIG. 3 illustrates the exchange of messages on a control channel between a radio 200 and BSS sites during activation or joining of the talkgroup by radio 200. The ordered sequence of message exchange runs from top to bottom, with a transmitting (Tx) device and receiving (Rx) device indicated at each end of the message being communicated between devices. The group call controller 135 operating in the background of the FDMA site 122 and TDMA site 120 generates and transmits control messages that are communicated to radio 200 and receives messages on the control channel from radio 200. As shown, radio 200 first communicates a group request message to FDMA site 122 to affiliate with a talk group, which message is forwarded to group call controller 135. Then, based on the response received from group call controller 135 (transmitted via FDMA site 122), radio 200 communicates a second group request message to TDMA site 120 to re-affiliate with the talk group.

Notably, either request message (whether communicated via the FDMA site 122 or TDMA site 120) may be rejected by the group call controller 135. Group call controller 135 determines which requests to allow based on one or more factors, including current allocation/availability of the requested resources and/or priority of the requesting user, for example. If the group call controller 135 does not reject the request, the controller 135 establishes a connection to the other radios in the talk group and the radio 200 communicates with the talk group via the particular BSS site.

With particular reference now to FIG. 3, when radio 200 desires to join a talk group, radio 200 transmits, via a control channel of the network, a group request message 305 to the communication resource allocator (or group call controller 135) via FDMA site 122. The group request message 305 includes certain identifying parameters of the radio 200, including an indication (e.g., a binary code representing "TDMA") that the radio is TDMA-capable, the radio's identification (ID), and the talk group's ID (TID). The request message 305 also includes a request to connect to the talk group. In one embodiment, the group request message 305 is required for radio 200 to register or affiliate with the talk group via the FDMA site. The base transceiver system (BTS) of the FDMA site 122 receives the group request message 305 to join a specified talk group and communicates the message 305 to group call controller 135.

According to one embodiment of the invention, upon receiving the group request message 305 from the radio 200, the communication resource allocator (of group call controller 135) provides a modified group connect response (or acknowledgement) message 310 using the group ID on a paging channel (PCH) to enable radio 200 to join the talk group via the FDMA site using FDMA communication protocol. The modified group connect response message 310 also provides a prompt/signal, which triggers the talk group utility of radio 200 to locate a TDMA site (120) and issue a group re-affiliate message 315 on a next channel. If the group re-affiliate message 315 is received at TDMA site 120, the resource allocator of group call controller 135 generates an acknowledgement message 320 informing the radio 200 of a successful connection to the TDMA talk group via TDMA communication protocol.

In a more general application, when the TDMA-capable radio 200 registers to the FNE, the FNE checks the operating mode of the radio 200 and the FDMA site's capabilities. If the radio 200 is TDMA capable and requests to be affiliated to a talk group at the FDMA site 122, the group call controller 135 of the FNE performs a series of checks. These checks include: (a) determining if all the existing affiliated members of the talk group are operating in TDMA mode; and (b) determining if the talk group is currently operating in TDMA mode as well. Assuming both conditions are true, the group call controller 135 generates a response message to send to the radio 200 to trigger/request the radio 200 re-affiliate with the talk group via a TDMA site (120). This response message, referred to herein as a modified group connect response message 310, is a message that is generated and sent to the radio 200, and the message triggers programmed functionality within the radio 200, which functionality includes making the radio 200 switch from the current affiliation to the talk group via the FDMA site 122 to an affiliation via the TDMA site (120). Notably, the group call controller 135 does not de-affiliate the radio 200 from the talk group or from the FDMA site 122, and the radio 200 remains affiliated to the talk group via the FDMA site 122 until a TDMA site is located by the radio 200 and utilized to affiliate the radio with the talk group.

Figure 4:
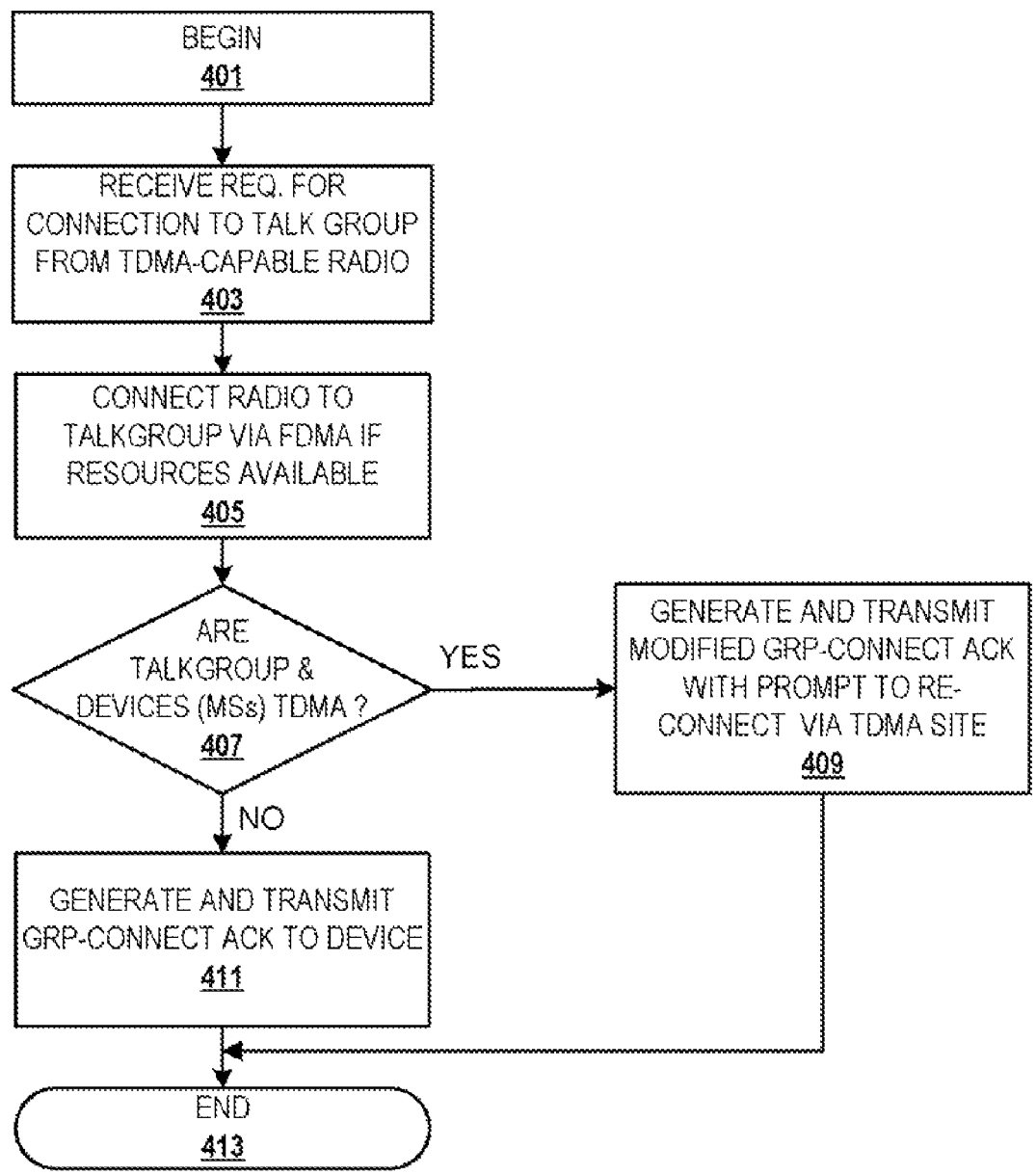
FIG. 4 is a flow chart illustrating the process by which a group call controller triggers a TDMA-capable radio to re-affiliate with a TDMA-based talk group via a TDMA site, after the radio initially connects via an FDMA site, according to one embodiment of the invention.
Figure 5:
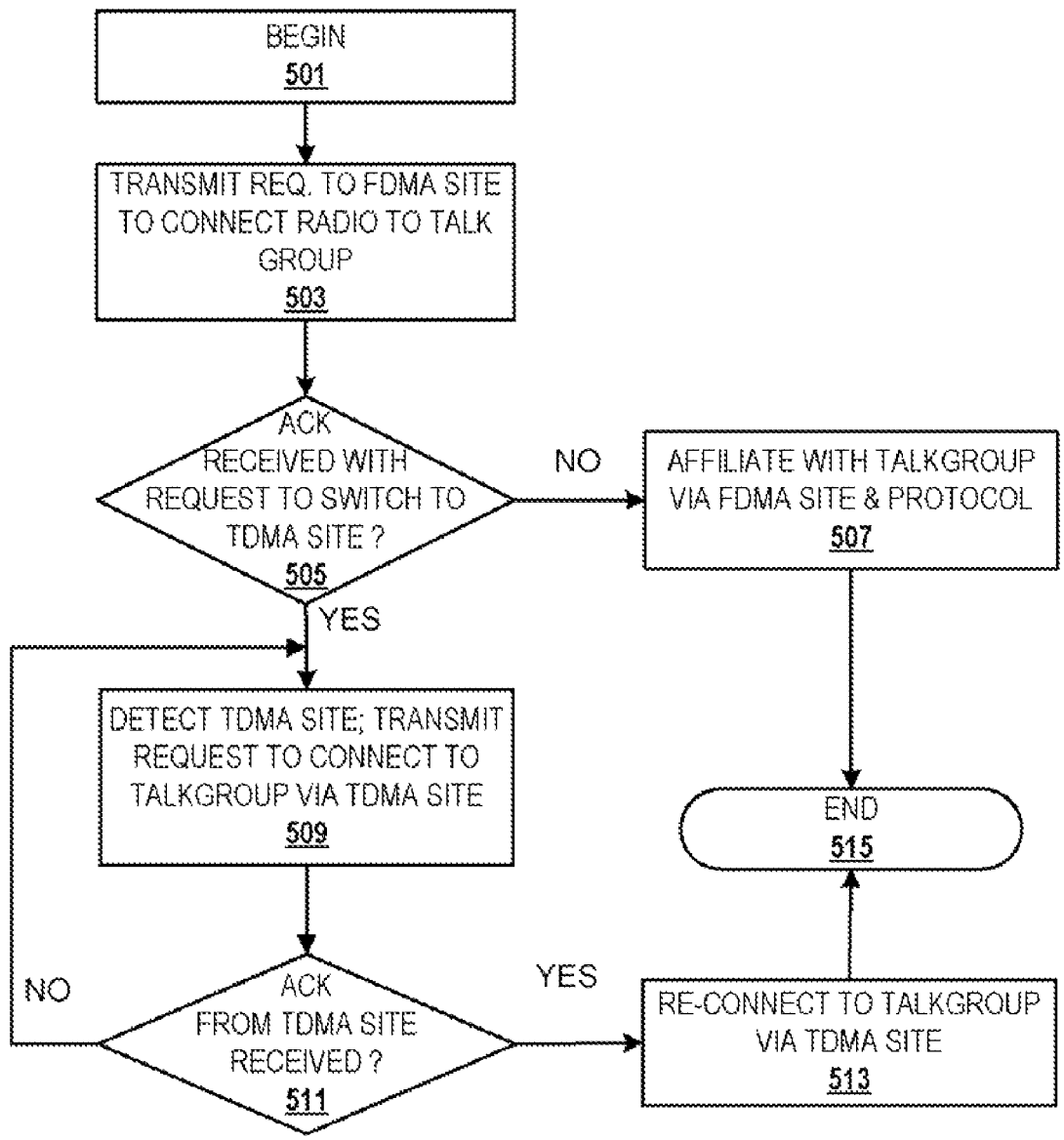
FIG. 5 is a flow chart illustrating the process by which a TDMA-capable radio initiates a re-connection to a TDMA-based talk group via a TDMA site, after the radio initially connects via an FDMA site, according to one embodiment of the invention.

FIGS. 4 and 5 are flow charts illustrating the methods by which the above processes that enable switching a radio's connection to a talk group from an FDMA site to a TDMA site are completed, according to embodiments of the invention. The methods illustrated in FIGS. 4 and 5 are described with reference to components shown in FIGS. 1-3; however, it should be understood that references to these figures is merely for convenience and that alternative representations of the components and/or functions illustrated by FIGS. 1-3 can be employed when implementing the various methods. Key portions (system-level) of the methods may be completed by group call controller 135 (FIG. 1) or a talk group re-affiliation triggering (TGRT) utility executing within a BSC of FDMA site 122 (FIG. 1). Other portions (radio device-level) of the methods may be supported by talk group utility 215 (FIG. 2) executing within radio 200. The methods of FIGS. 4 and 5 are thus described from the perspective of logic components operating at the FNE 150 and talk group utility 215, executing on radio 200, respectively.

The method of FIG. 4 begins at block 401 and proceeds to block 403 at which the group call controller 135 receives a group request message 305 from a TDMA-capable radio via FDMA site 122. The group call controller 135 determines that the resources are available and connects the radio 200 to the talk group via FDMA protocols, as shown at block 405. The group call controller 135 determines at block 407 whether the talk group and existing radios participating in the talk group are operating in TDMA mode.

Returning now to the flow chart, if the talk group and existing radios are operating via TDMA, the group call controller generates and transmits modified group connect response message 310, which includes a prompt to the radio to trigger an attempt to re-affiliate to the talk group via a TDMA site, as shown at block 409. However, if either the talk group or the existing radios is not operating in TDMA mode, then a standard acknowledgement (group connect response message) is generated and transmitted as shown at block 411. The standard acknowledgement does not include the prompt to re-affiliate to the talk group via a TDMA site. The radio 200 remains connected to the talk group via FDMA site 122. The process then ends, as shown at block 413.

From an implementation standpoint, the functional features described above may be implemented for a different pairing of communication protocols. Thus, for example, one more general embodiment of the invention provides a communication system that includes a controller having code executing thereon for completing a set of functions, which include: receiving a request message from a radio to affiliate with a talk group, the request message being received via a first site operating according to a first communication protocol, which site enables communication with the radio via the first communication protocol; detecting that the radio is capable of communicating using at least the first communication protocol and a second communication protocol; and in response to determining that the talk group and each radio affiliated with the talk group are operating according to the second communication protocol, forwarding a modified group connect response message to the radio, wherein the modified group connect response message triggers the radio to attempt to re-affiliate to the talk group via a second site operating according to the second communication protocol.

A further extension of that general embodiment provides the controller with executing code for accessing the database to determine operating parameters of the talk group and the radios affiliated with the talk group; parsing the request message to determine an identifier (ID) of the talk group; evaluating parameters within the request message to determine that the radio is capable of communicating via the second communication protocol; evaluating operating parameters of the talk group to determine if (a) the talk group is communicating using the second protocol and (b) each radio affiliated with the talk group is coupled to the talk group via a second site and is communicating within the talk group according to second protocol; generating the modified group response message to include talk group-specific identification and a prompt to activate a re-affiliation process to re-affiliate the radio to the talk group via a second site operating according to the second communication protocol; forwarding the modified group connect response message only when the talk group and each radio affiliated with the talk group are communicating according to the second protocol; and otherwise forwarding a standard group connect response message when at least one of the talk group and the radios affiliated with the talk group is not communicating according to TDMA protocol.

The controller is operationally coupled to the first site (FMDA site) and the second site (TDMA site) and includes executing code for: detecting a new message from the radio, via the TDMA site, to re-affiliate to the talk group via the TDMA site following initial receipt of the request message; automatically re-affiliating the radio to the talk group via the TDMA site utilizing TDMA communication protocol when TDMA resources are available; and generating a signal that is transmitted to the radio, said signal indicating that an affiliation of the radio to the talk group is complete.

FIG. 5 provides a description of the processing that occurs at the radio 200, according to one embodiment of the invention. The method begins at block 501 and proceeds to block 503 at which the radio transmits a group request message 305 to an FDMA site. At block 505, the radio 200 detects receipt of a group connect response message (310) from the group call controller 135 via the FDMA site 122. The group connect message may or may not be modified, and the radio 200 determines this status by deciphering whether the response message (310) includes some indication (e.g., a prompt/suggestion/request) to switch to a TDMA site. If no such indication is received with the response message (310), the radio 200 affiliates with the talk group via the FDMA site, as shown at block 507, and the process ends and block 515.

If the indication is received, the radio 200 initiates a search for a TDMA site within the location. The talk group utility executing within the radio 200 initiates a search for a new control channel to find a TDMA site 120, whenever the indication is included within the group connect response message 310. Notably, if the radio 200 is not able to find a TDMA site within range of the radio 200 (or an available network channel), the radio 200 does not need to perform any other action, because the radio remains affiliated to the talk group via the FDMA site 122. The radio 200 may eventually switch from the FDMA site 122 to a TDMA site 120, if one is (or becomes) available. This switch will cause the entire talk group to then operate in TDMA mode.

Returning to the flow chart, the radio 200 automatically generates and transmits a group re-affiliate message 315 to affiliate to the talk group via the located TDMA site 120, as indicated at block 509. Whenever a new TDMA site 120 is detected, the radio 200 transmits a re-affiliate message 315 to the detected TDMA site 120 to attempt to affiliate the radio to the talk group via that TDMA site 120. When the group call controller 135 accepts the affiliation of the radio 200 to the talk group via the TDMA site 120, the group call controller 135 transmits an acknowledgement message 320 and connects the radio 200 the talk group. When the acknowledgment message 320 is received from the group call controller 135, as determined at block 511, the radio re-affiliates to the talk group via the TDMA site 120, as shown at block 513. The process then ends at block 515.

In the flow charts above, one or more of the methods may be embodied in a computer readable medium containing computer readable code such that a series of steps are performed when the computer readable code is executed on a processing device. In some implementations, certain steps of the methods are combined, performed simultaneously or in a different order, or perhaps omitted, without deviating from the scope of the invention. Thus, while the method steps are described and illustrated in a particular sequence, use of a specific sequence of steps is not meant to imply any limitations on the invention. Changes may be made with regards to the sequence of steps without departing from the scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been particularly shown and described with reference to a preferred embodiment, it will be understood by those skilled in the art that various changes in form and detail may be made therein without departing from the scope of the invention.

What is claimed is:

1. A system comprising:
a controller having code executing thereon for completing the functions of:
receiving a request message from a radio to affiliate with a talk group, said request message being received via a first site operating according to a first communication protocol, which site enables communication with the radio via the first communication protocol; and
detecting that the radio is capable of communicating using at least the first communication protocol and a second communication protocol; and
in response to determining that the talk group and each radio affiliated with the talk group are operating according to the second communication protocol, forwarding a modified group connect response message to the radio, wherein said modified group connect response message triggers the radio to attempt to re-affiliate to the talk group by sending a second request message via a second site operating according to the second communication protocol.

2. The system of claim 1, wherein:
the first communication protocol is a frequency division multiple access (FDMA) protocol;
the second communication protocol is a time division multiple access (TDMA) protocol;
the radio is a TDMA-capable radio; and
said controller further comprises code executing thereon for:
in response to the request message received according to the first communication protocol, affiliating the TDMA-capable radio to the talk group via FDMA protocol when resources are available for FDMA connection to the talk group.

3. The system of claim 2, wherein:
said first site is a first base station subsystem (BSS) that communicates via FDMA communication protocol and which receives a communication of the request message from the radio via FDMA transmission;
said second site a second BSS that communicates via TDMA communication protocol and which receives messages from the radio via TDMA transmission;
said controller is operationally coupled to the first BSS and the second BSS; and
said controller further includes code that when executed thereon provides the functions of:
detecting the second request message from the radio, via the TDMA site, to re-affiliate to the talk group via the TDMA site following initial receipt of the request message; and
automatically re-affiliating the radio to the talk group via the TDMA site utilizing TDMA communication protocol when TDMA resources are available.

4. The system of claim 1, further comprising:
a database utilized to store information about the talk group and affiliated radios, including identifying information and operating parameters for the talk group and affiliated radios; and
wherein the controller further includes code executing thereon for accessing the database to determine operating parameters of the talk group and the radios affiliated with the talk group.

5. The system of claim 1, said controller further comprising that when executed performs the functions of:
parsing the request message to determine an identifier (ID) of the talk group;
evaluating parameters within the request message to determine that the radio is capable of communicating via the second communication protocol;
evaluating operating parameters of the talk group to determine if (a) the talk group is communicating using the second protocol and (b) each radio affiliated with the talk group is coupled to the talk group via a second site and is communicating within the talk group according to second protocol; and
forwarding the modified group connect response message only when the talk group and each radio affiliated with the talk group are communicating according to the second protocol.

6. The system of claim 5, wherein said controller further comprises code executing thereon for forwarding a standard group connect response message when at least one of the talk group and the radios affiliated with the talk group is not communicating according to TDMA protocol.

7. The system of claim 1, wherein said controller further includes code that when executed provides the functions of generating a signal that is transmitted to the radio, said signal indicating that an affiliation of the radio to the talk group is complete.

8. The system of claim 1, wherein said controller further includes code executed thereon for:
generating the modified group response message to include talk group-specific identification and a prompt to activate a re-affiliation process to re-affiliate the radio to the talk group via a second site operating according to the second communication protocol; and
forwarding the modified group response message to the radio from which the request message originated.

9. In a communication system having a controller that controls access to talk groups, a method comprising the steps of:
receiving a request message from a radio to affiliate with a talk group, said request message being received via a first site operating according to a first communication protocol, which site enables communication with the radio via the first communication protocol; and detecting that the radio is capable of communicating using at least the first communication protocol and a second communication protocol; and in response to determining that the talk group and each radio affiliated with the talk group are operating according to the second communication protocol, forwarding a modified group connect response message to the radio, wherein said modified group connect response message triggers the radio to attempt to re-affiliate to the talk group by sending a second request message via a second site operating according to the second communication protocol.

10. The method of claim 9, wherein:

the first communication protocol is a frequency division multiple access (FDMA) protocol; the second communication protocol is a time division multiple access (TDMA) protocol; the radio is a TDMA-capable radio; and said method further comprising, in response to the request message received according to the first communication protocol, affiliating the TDMA-capable radio to the talk group via FDMA protocol when resources are available for FDMA connection to the talk group.

11. The method of claim 10, wherein:

said first site is a first base station subsystem (BSS) that communicates via FDMA communication protocol and which receives a communication of the request message from the radio via FDMA transmission;

said second site is a second BSS that communicates via TDMA communication protocol and which receives messages from the radio via TDMA transmission;

said controller is operationally coupled to the first BSS and the second BSS; and said method further comprises the steps of:
  detecting the second request message from the radio, via the TDMA site, to re-affiliate to the talk group via the TDMA site following initial receipt of the request message; and
  automatically re-affiliating the radio to the talk group via the TDMA site utilizing TDMA communication protocol when TDMA resources are available.

12. The method of claim 9, wherein:

the system further includes a database utilized to store information about the talk group and affiliated radios, including identifying information and operating parameters for the talk group and affiliated radios; and said method further comprises accessing the database to determine operating parameters of the talk group and the radios affiliated with the talk group.

13. The method of claim 9, further comprising the steps of:
parsing the request message to determine an identifier (ID) of the talk group;

evaluating parameters within the request message to determine that the radio is capable of communicating via the second communication protocol;

evaluating operating parameters of the talk group to determine if (a) the talk group is communicating using the second protocol and (b) each radio affiliated with the talk group is coupled to the talk group via a second site and is communicating within the talk group according to second protocol;

forwarding the modified group connect response message only when the talk group and each radio affiliated with the talk group are communicating according to the second protocol; and forwarding a standard group connect response message when at least one of the talk group and the radios affiliated with the talk group is not communicating according to TDMA protocol.

14. The method of claim 9, further comprising a step of generating a signal that is transmitted to the radio, said signal indicating that a requested affiliation of the radio to the talk group is complete.

15. The method of claim 9, further comprising the step of:
generating the modified group response message to include talk group-specific identification and a prompt to activate a re-affiliation process to re-affiliate the radio to the talk group via a second site operating according to the second communication protocol; and forwarding the modified group response message to the radio from which the request message originated.

16. In a wireless radio that is time division multiple access (TDMA)-capable, a method comprising the steps of:
transmitting, to a frequency division multiple access (FDMA) site, a request to be affiliated with a talk group, said request transmitted according to an FDMA protocol;

receiving a response message indicating that an affiliation of the radio to the talk group has been initiated via the FDMA site; and when the response message is a modified response message, which includes a prompt to re-affiliate the radio to the talk group via a TDMA site:
automatically locating and checking for access to a TDMA site that is within communication range of the radio; and when the TDMA site is located, dynamically transmitting a new request to re-affiliate the radio to the talk group via the TDMA site using TDMA communication protocol.

17. The method of claim 16, further comprising the step of:
in response to receiving an acknowledgement of a completion of a re-affiliation to the talk group via the TDMA site, automatically cancelling the affiliation to the talk group via the FDMA.

18. The method of claim 16, wherein the radio is a wireless phone.

19. The method of claim 16, wherein the radio supports at least an FMDA operating mode and a TDMA operating mode, said method further comprising the steps of:
establishing communication with an FDMA site using the FDMA operating mode when the FDMA site is detected and affiliation to the talk group is desired; and establishing communication with a TDMA site using the TDMA operating mode when the TDMA site is detected and re-affiliation to the talk group is desired; and when a TDMA site is detected during FDMA operation mode, dynamically switching a mode of communication from the FDMA operating mode to the TDMA operating mode and re-establishing an ongoing communication using the TDMA site.

* * * * *

UNITED STATES PATENT AND TRADEMARK OFFICE
CERTIFICATE OF CORRECTION

| | |
|---|---|
| PATENT NO. | : 7,974,651 B2 |
| APPLICATION NO. | : 11/762094 |
| DATED | : July 5, 2011 |
| INVENTOR(S) | : Balo |

It is certified that error appears in the above-identified patent and that said Letters Patent is hereby corrected as shown below:

In Column 8, Line 16, delete "ends and" and insert -- ends at --, therefor.

In Column 10, Line 26, in claim 5, delete "said" and insert -- wherein said --, therefor.

Signed and Sealed this
Fourth Day of December, 2012

David J. Kappos
*Director of the United States Patent and Trademark Office*